United States Patent [19]
Light et al.

[11] Patent Number: 5,930,293
[45] Date of Patent: Jul. 27, 1999

[54] METHOD AND APPARATUS FOR ACHIEVING ANTENNA RECEIVE DIVERSITY WITH WIRELESS REPEATERS

[75] Inventors: Jeffrey Ross Light, Lincolnwood; Charles Varvaro, Glendale Heights, both of Ill.

[73] Assignee: Lucent Technologies Inc., Murray Hill, N.J.

[21] Appl. No.: 08/812,902

[22] Filed: Mar. 10, 1997

[51] Int. Cl.⁶ ....................................................... H04B 3/36
[52] U.S. Cl. ............................... 375/211; 375/347; 455/7; 455/18; 455/273; 455/276.1
[58] Field of Search ..................................... 375/200, 206, 375/211, 267, 299, 347, 349, 214; 370/315, 316, 319, 320, 327; 455/7, 11.1, 12.1, 13.3, 18, 10, 15, 101, 132, 272, 273, 276.1, 278.1, 303, 304; 343/824, 844, 893; 340/425.1; 342/368, 375

[56] References Cited

U.S. PATENT DOCUMENTS

| | | | |
|---|---|---|---|
| 4,901,307 | 2/1990 | Gilhousen et al. | 370/320 |
| 5,347,535 | 9/1994 | Karasawa et al. | 370/342 |
| 5,513,176 | 4/1996 | Dean et al. | 370/335 |
| 5,592,507 | 1/1997 | Kobayashi | 375/211 |
| 5,659,572 | 8/1997 | Schilling | 375/200 |

OTHER PUBLICATIONS

Qualcomm, Inc., The CDMA Network Engineering Handbook, vol. 1: Concepts in CDMA, Draft Version X1, pp. 6–30 to 6–32. Dec. 1992.

*Primary Examiner*—Don N. Vo
*Attorney, Agent, or Firm*—Michael B. Johannesen; Neil R. Ormos

[57] ABSTRACT

A wireless repeater comprising a first antenna for receiving a first signal from a wireless terminal and for transmitting the first signal along a first path; a second antenna for receiving a second signal from the wireless terminal and for transmitting the second signal along a second path; a summing circuit for receiving the first signal from the first path and the second signal from the second path, for summing the first signal and the second signal to form an aggregate signal, and for outputting the aggregate signal along a third path; a delay in the second signal that makes the second signal path longer than the first signal path; and a third antenna for receiving the third signal from the third path and for transmitting the third signal.

14 Claims, 3 Drawing Sheets

METHOD AND APPARATUS FOR ACHIEVING ANTENNA RECEIVE DIVERSITY WITH WIRELESS REPEATERS

TECHNICAL FIELD

The present invention relates to wireless telecommunications in general, and, more particularly, to a method and apparatus for achieving antenna receive diversity with a wireless repeater.

BACKGROUND OF THE INVENTION

FIG. 1 depicts a schematic diagram of base station 101 that comprises a single receive antenna, antenna 103, through which base station 101 receives signals transmitted from wireless terminal 107. As is well known to those skilled in the art, the use of a single receive antenna at base station 101 leaves the received signal quality vulnerable to a natural phenomenon known as Rayleigh fading.

Rayleigh fading occurs when the multipath components of a radiated signal destructively interfere at the receive antenna with the result that the signal-to-noise ratio of the composite received signal is below an acceptable threshold. Typically, a small change in the position of the wireless terminal changes the amplitude and relative phase of the respective multipath components at the receive antenna with the result that the signal-to-noise ratio of the received signal may be substantially improved. Unfortunately, another small change in position may degrade the signal-to-noise ratio. Empirically, as a wireless terminal moves and the path between the wireless terminal and base station changes with time, the received signal quality vacillates. This vacillation is known as Rayleigh fading.

To mitigate the effects of Rayleigh fading, base stations are often constructed with two, spatially diverse receive antennas. FIG. 2 depicts two antennas, receive antenna 203 and receive antenna 205, which are typically separated by some multiple (or submultiple) of the wavelength of the received signal's carrier signal. Because the signal path from wireless terminal 207 to each of receive antenna 203 and receive antenna 205 is always different, the multipath components at each receive antenna have different amplitudes and phases and, therefore, it is rare that the signal-to-noise ratio of each composite signal is simultaneously low at both receive antennas. Empirically, when the signal-to-noise ratio at one receive antenna is low, the signal quality at the other is typically satisfactory. This fact enables the base station to receive the transmitted signal at both antennas, to compare the relative signal quality at each antenna and to select, at each moment in time, the better signal. This technique is known as antenna receive diversity and it typically improves the overall received signal quality by 3 to 12 dB, or more.

Occasionally, the geographic area serviced by a base station is so large that the signals transmitted by a wireless terminal at the fringe of the area cannot be satisfactorily received, without assistance, by the base station. Alternatively, sometimes the geographic area serviced by a base station contains hills and valleys such that the signals transmitted by a wireless terminal to a base station are shadowed by the terrain. To alleviate this problem, wireless repeaters are employed.

FIG. 3 depicts a schematic diagram of base station 301, with receive antenna 303 and receive antenna 305, wireless terminal 307 and repeater 309, in the standard repeater configuration. The purpose of repeater 309 is to receive signals from wireless terminal 307, amplify them and re-transmit them to base station 301, when the distance or terrain makes it unlikely that wireless terminal 307 can transmit directly to base station 301.

Repeater 309 has one receive antenna for receiving signals from wireless terminal 307 and one transmit antenna for re-broadcasting signals those signals to base station 301. Because repeater 309 has only one receive antenna, the quality of the signals it receives are subject to Rayleigh fading. Furthermore, the fact that base station 301 incorporates receive antenna diversity becomes largely superfluous because the position of repeater 309 with respect to base station 301 does not change with time. Therefore, although repeater 309 is beneficial in that it boosts the overall signal strength of the signals from wireless terminal 307, the improvements in signal quality afforded by antenna receive diversity at base station 301 are lost.

SUMMARY OF THE INVENTION

Embodiments of the present invention are capable of re-broadcasting multipath signals while avoiding many of the costs and restrictions associated with prior methods. In particular, embodiments of the present invention can be fabricated inexpensively that preserve the spatial diversity of multipath signals emanating from a wireless terminal.

These results are obtained in an illustrative embodiment comprising a first antenna for receiving a first signal from a wireless terminal and for transmitting said first signal along a first path; a second antenna for receiving a second signal from said wireless terminal and for transmitting said second signal along a second path; a summing circuit for receiving said first signal from said first path and said second signal from said second path, for summing said first signal and said second signal to form an aggregate signal, and for outputting said aggregate signal along a third path; a delay in said second signal that makes said second signal path longer than said first signal path; and a third antenna for receiving said third signal from said third path and for transmitting said third signal.

BRIEF DESCRIPTION OF THE DRAWINGS

A more complete understanding of the invention may be obtained from consideration of the following description in conjunction with the drawings, in which.

DETAILED DESCRIPTION

Figure 1:
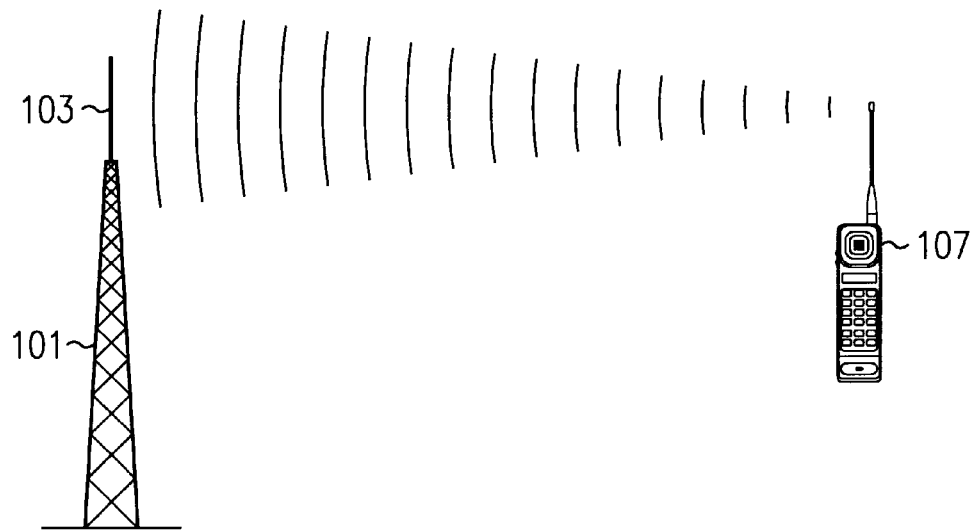
FIG. 1 depicts a schematic diagram of a wireless terminal communicating with a wireless base station.
Figure 2:
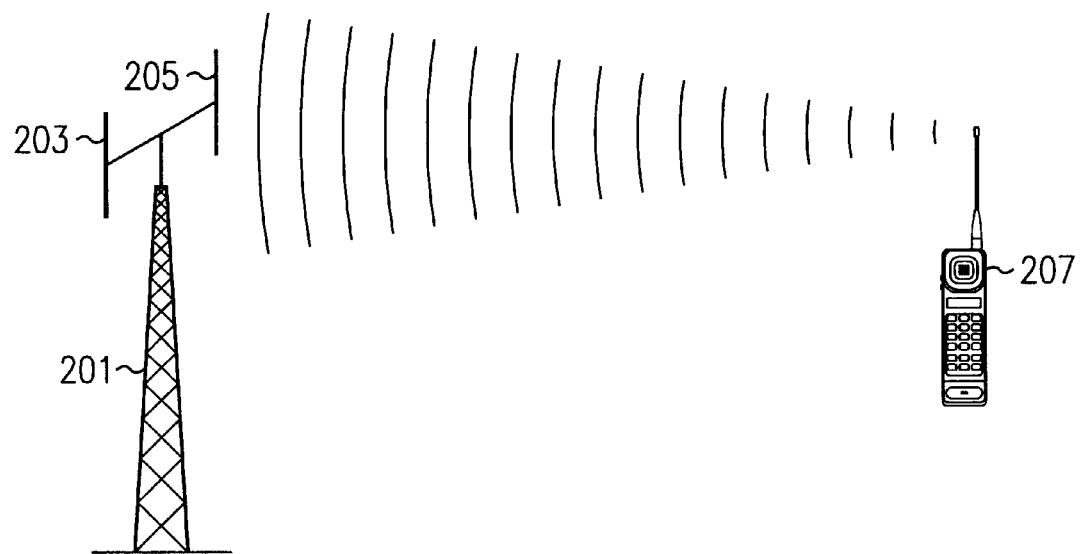
FIG. 2 depicts a schematic diagram of a wireless terminal communicating with a wireless base station that employs receive antenna diversity.
Figure 3:
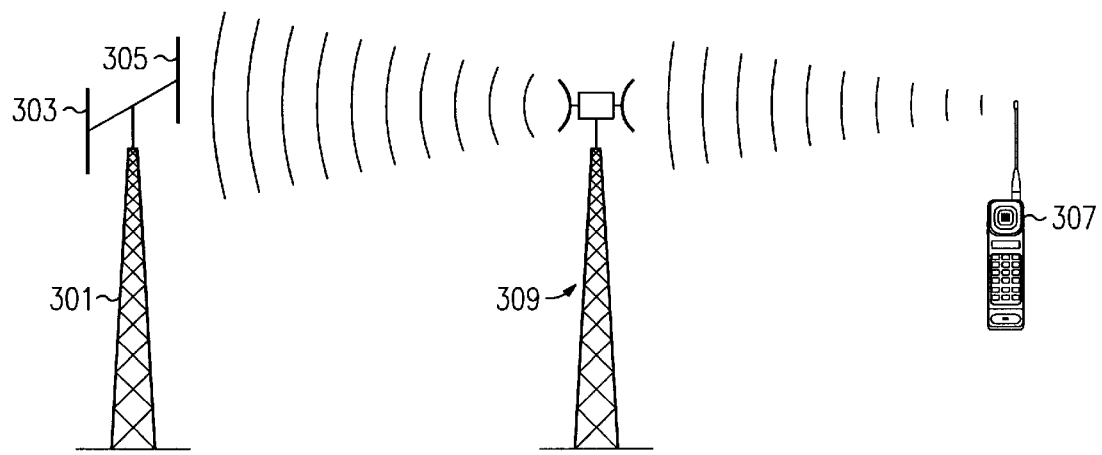
FIG. 3 depicts a schematic diagram of a wireless terminal communicating with a wireless base station that employs receive antenna diversity, via a wireless repeater.
Figure 4:
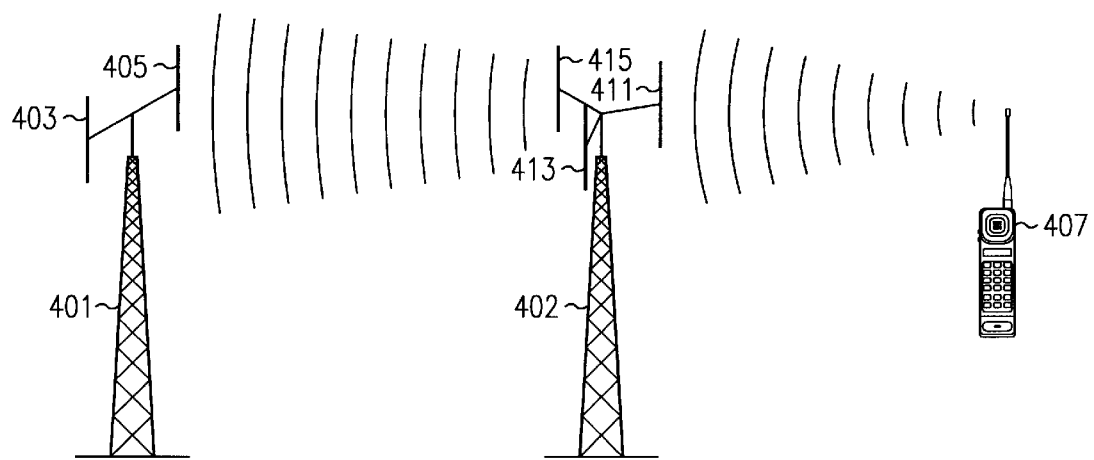
FIG. 4 depicts a schematic diagram of a wireless terminal communicating with a wireless base station that employs receive antenna diversity, via an illustrative embodiment of the present invention.
Figure 5:
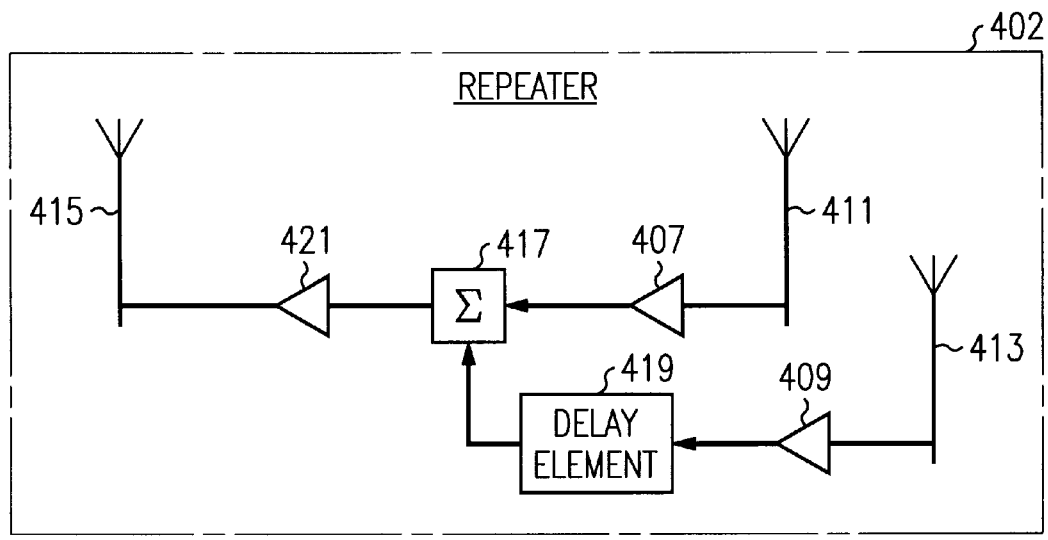
FIG. 5 depicts a schematic diagram of one embodiment of the present invention.

FIG. 4 depicts a schematic diagram of an illustrative embodiment of the present invention, which comprises repeater 402. As shown in FIG. 5, one embodiment of repeater 402 comprises two receive antennas, receive antenna 411 and receive antenna 413, which are advantageously made and used in the standard configuration for receive antenna diversity. The output of receive antenna 411 is fed into low-noise amplifier 407 and then into summing circuit 417 through a first signal path, and the output of receive antenna 413 is fed into low-noise amplifier 409 and then into summing circuit 417, but through a second signal path. Summing circuit 417 advantageously performs an unweighted vector addition on both signals in well-known fashion. The composite signal from summing circuit 417 is fed into amplifier 421 and transmit antenna 415 along a third signal path. Because repeater 409 does not move with respect to base station 401, transmit antenna 415 is advantageously a directional antenna (e.g., a parabolic or high-gain antenna) pointed directly at base station 401.

Delay element 419 is advantageously in the second signal path between receive antenna 413 and summing circuit 417. Delay element 419 is advantageously a length of conducting material (e.g., coaxial cable, a section of strip line, a microstrip, etc., or a lumped delay line) that causes the second signal path to be longer than the signal path taken by the first signal. When the signals being re-broadcast by repeater 409 are direct sequence spread spectrum signals, as used in IS-95 CDMA wireless telecommunications systems, and thus comprise thousands of temporal "chips," the delay through delay element 419 is advantageously at least two chips, which enables rake receivers in base station 401 to resolve and correlate the two signals. It will be clear to those skilled in the art how to make and use the rake receivers in base station 101. U.S. Pat. No. 5,237,586, entitled "Rake Receiver with Selective Ray Combining," issued Aug. 17, 1993; U.S. Pat. No. 5,566,206; entitled "Method and Apparatus for Determining Data Rate of Transmitted Variable Rate Data in a Communications Receiver," issued Oct. 15, 1996; and U.S. Pat. No. 5,305,349, entitled "Quantized Coherent Rake Receiver," issued Apr. 19, 1994 teach how to make and use rake receivers and are hereby incorporated by reference. The rake receivers in base station 401 enable repeater 402 to convert the spatially diverse signals coming from wireless terminal 407 into temporally diverse signals, which appear as multipath signals at base station 401.

It should be noted however, that the vector addition of the two signals by summing circuit 417 creates a 3 dB signal-to-noise loss, and, therefore, embodiments of the present invention are more advantageous when the signal-to-noise gain from employing the antenna diversity at repeater 409 is greater than the 3 dB signal-to-noise loss from summing circuit 417.

Figure 6:
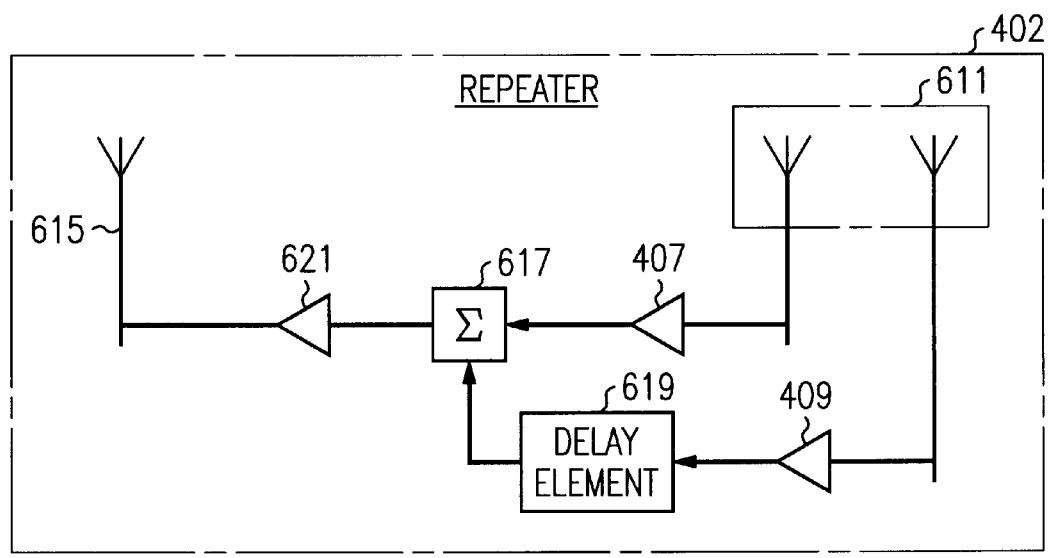
FIG. 6 depicts a schematic diagram of a second embodiment of the present invention.

FIG. 6 depicts a schematic diagram of an alternative embodiment of the present invention, in which the spatially diverse antennas of FIG. 5 are replace with polarization diversity antenna 611. According to this embodiment, one lead from polarization diverse antenna 611 is fed into low-noise amplifier 607 and then into summing circuit 617 and the other lead is fed into low-noise amplifier 609 and then into delay element 619. In this embodiment, the polarization diversity of the signals from wireless terminal 407 (FIG. 4) is converted into temporally diversity, which is processed by repeater 402 and base station 401 in the same manner as that described with respect to the embodiment in FIG. 5.

Again, it should be noted that this embodiment of the present invention is more advantageous when the signal-to-noise gain from employing the polarization diversity antennas is greater than the 3 dB signal-to-noise loss from summing circuit 417.

It is to be understood that the above-described embodiments are merely illustrative principles of the invention, and that many variations may be devised by those skilled in the art without departing from the scope of this invention. It is, therefore, intended that such variations be included within the scope of the claims.

What is claimed is:

1. A repeater comprising:

a first antenna for receiving a first signal from a wireless terminal and for transmitting said first signal along a first path;

a second antenna for receiving a second signal from said wireless terminal and for transmitting said second signal along a second path;

a delay in said second signal path;

a summing circuit for receiving said first signal from said first path and said second signal from said second path, for summing said first signal and said second signal to form an aggregate signal, and for outputting said aggregate signal along a third path, said aggregate signal including a component representing said first signal and a component representing said second signal wherein said delay causes said second signal to be displaced in time with respect to said first signal;

a third antenna for receiving said aggregate signal from said third path and for transmitting said aggregate signal.

2. The repeater of claim 1 wherein said first signal is a direct sequence spread spectrum signal that comprises a plurality of chips, said second signal is a direct sequence spread spectrum signal that comprises a plurality of chips, and said delay in said second signal path displaces in time said second signal at least two chips with respect to said first signal.

3. The repeater of claim 1 wherein said first antenna and said second antenna comprise a polarization diversity antenna.

4. The repeater of claim 1 wherein said third antenna transmits via a wireless medium.

5. The repeater of claim 1 wherein said first signal is assigned to a first carrier frequency, said second signal is assigned to said first carrier frequency, and said aggregate signal exhibits a carrier frequency substantially equal to said first carrier frequency.

6. The repeater of claim 5 wherein said summing circuit is operated at a frequency substantially equal to said first carrier frequency.

7. The repeater of claim 5 wherein said delay circuit is operated at a frequency substantially equal to said first carrier frequency.

8. A method for re-broadcasting a signal comprising the steps of:

receiving a first signal from a wireless terminal via a first antenna;

transmitting said first signal to a summing circuit along a first signal path;

receiving a second signal from said wireless terminal via a second antenna;

transmitting said second signal to said summing circuit along a second signal path;

delaying said second signal along said second signal path;

summing at said summing circuit said first signal and said second signal to form an aggregate signal including a component representing said first signal and a component representing said second signal, wherein said delaying step causes said second signal to be displaced in time with respect to said first signal; and transmitting said aggregate signal via a third antenna.

9. The method of claim 8 wherein said first signal is a direct sequence spread spectrum signal that comprises a plurality of chips, said second signal is a direct sequence spread spectrum signal that comprises a plurality of chips, and said delay in said second signal path displaces in time said second signal at least two chips with respect to said first signal.

10. The method of claim 8 wherein said first antenna and said second antenna comprise a polarization diversity antenna.

11. A repeater comprising:

a first antenna for receiving a first signal from a wireless terminal and for transmitting said first signal along a first path;

a second antenna for receiving a second signal from said wireless terminal and for transmitting said second signal along a second path;

a delay in said second signal path;

a summing circuit for receiving said first signal from said first path and said second signal from said second path, for summing said first signal and said second signal to form an aggregate signal including a component representing said first signal and a component representing said second signal, and for outputting said aggregate signal along a third path, said delay substantially precluding synchronization of said first and second signals, thereby preserving in said aggregate signal information contained in said first signal and said second signal such that said information may be recovered; and a third antenna for receiving said aggregate signal from said third path.

12. A method for re-broadcasting a signal comprising the steps of:

receiving a first signal from a wireless terminal via a first antenna;

transmitting said first signal to a summing circuit along a first signal path;

receiving a second signal from said wireless terminal via a second antenna;

transmitting said second signal to said summing circuit along a second signal path;

delaying said second signal along said second signal path;

summing at said summing circuit said first signal and said second signal to form an aggregate signal including a component representing said first signal and a component representing said second signal, said delaying step substantially precluding synchronization of said first and second signals, thereby preserving in said aggregate signal information contained in said first signal and said second signal such that said information may be recovered; and transmitting said aggregate signal via a third antenna.

13. A repeater comprising:

a first antenna for receiving a first signal from a wireless terminal and for transmitting said first signal along a first path;

a second antenna for receiving a second signal from said wireless terminal and for transmitting said second signal along a second path;

a summing circuit for receiving said first signal from said first path and said second signal from said second path, and for outputting said aggregate signal along a third path;

a delay in said second signal path that makes said second signal path longer than said first signal path; and a third antenna for receiving said aggregate signal from said third path and for transmitting said aggregate signal;

wherein any processing by said repeater of said first, second, and aggregate signals substantially excludes non-linear processing.

14. A method for re-broadcasting a signal comprising the steps of:

receiving a first signal from a wireless terminal via a first antenna;

transmitting said first signal to a processing circuit along a first signal path;

receiving a second signal from said wireless terminal via a second antenna;

transmitting said second signal to said processing circuit along a second signal path;

delaying said second signal along said second signal path so as to make said second signal path longer than said first signal path;

processing at said processing circuit said first signal and said second signal to form an aggregate signal, said processing substantially excluding non-linear processing; and transmitting said aggregate signal via a third antenna in a manner such that said preserved information may be recovered.

* * * * *